United States Patent
Nesbitt et al.

(10) Patent No.: US 10,451,461 B2
(45) Date of Patent: Oct. 22, 2019

(54) VENTURI AIR FLOW SENSOR AND CONTROL SYSTEM

(71) Applicant: Price Industries Limited, Winnipeg (CA)

(72) Inventors: Matthew Nesbitt, Calgary (CA); James Riese, Winnipeg (CA); Jarvis Penner, Winnipeg (CA)

(73) Assignee: Price Industries Limited, Winnipeg, Manitoba (CA)

( * ) Notice: Subject to any disclaimer, the term of this patent is extended or adjusted under 35 U.S.C. 154(b) by 51 days.

(21) Appl. No.: 15/969,315

(22) Filed: May 2, 2018

(65) Prior Publication Data

US 2019/0219427 A1    Jul. 18, 2019

Related U.S. Application Data

(60) Provisional application No. 62/616,670, filed on Jan. 12, 2018.

(51) Int. Cl.
| | |
|---|---|
| *G01F 1/44* | (2006.01) |
| *G01F 1/46* | (2006.01) |
| *G01F 5/00* | (2006.01) |
| *G05D 7/01* | (2006.01) |

(52) U.S. Cl.
CPC ............... *G01F 1/44* (2013.01); *G01F 5/005* (2013.01); *G05D 7/0173* (2013.01)

(58) Field of Classification Search
CPC ... G01F 1/44; G01F 1/46; G01F 5/005; G01F 23/29
See application file for complete search history.

(56) References Cited

U.S. PATENT DOCUMENTS

| | | | |
|---|---|---|---|
| 2010/0097892 A1* | 4/2010 | Aughton | G01F 23/2962 367/99 |
| 2017/0259226 A1* | 9/2017 | Bayer | B01F 5/106 |
| 2018/0259380 A1* | 9/2018 | Birch | A61B 5/087 |

* cited by examiner

*Primary Examiner* — Jewel V Dowtin
(74) *Attorney, Agent, or Firm* — Smith Gambrell & Russell LLP

(57) ABSTRACT

A Venturi air flow sensor and control system includes a Venturi housing comprising with an inlet section, an outlet section, and a reduced diameter horn shaped center section connecting the inlet section to the outlet section with a damper. A high pressure sensor tube with downstream openings extends across the inlet section on the outlet section and a low pressure sensor tube with downstream openings extends across the reduced diameter horn shaped section. The pressure from the low pressure sensor tube and the pressure from the high pressure sensor tube are connected to a controller. From the high pressure and the low pressure the controller determines the air flow and based on air flow operates the damper.

4 Claims, 2 Drawing Sheets

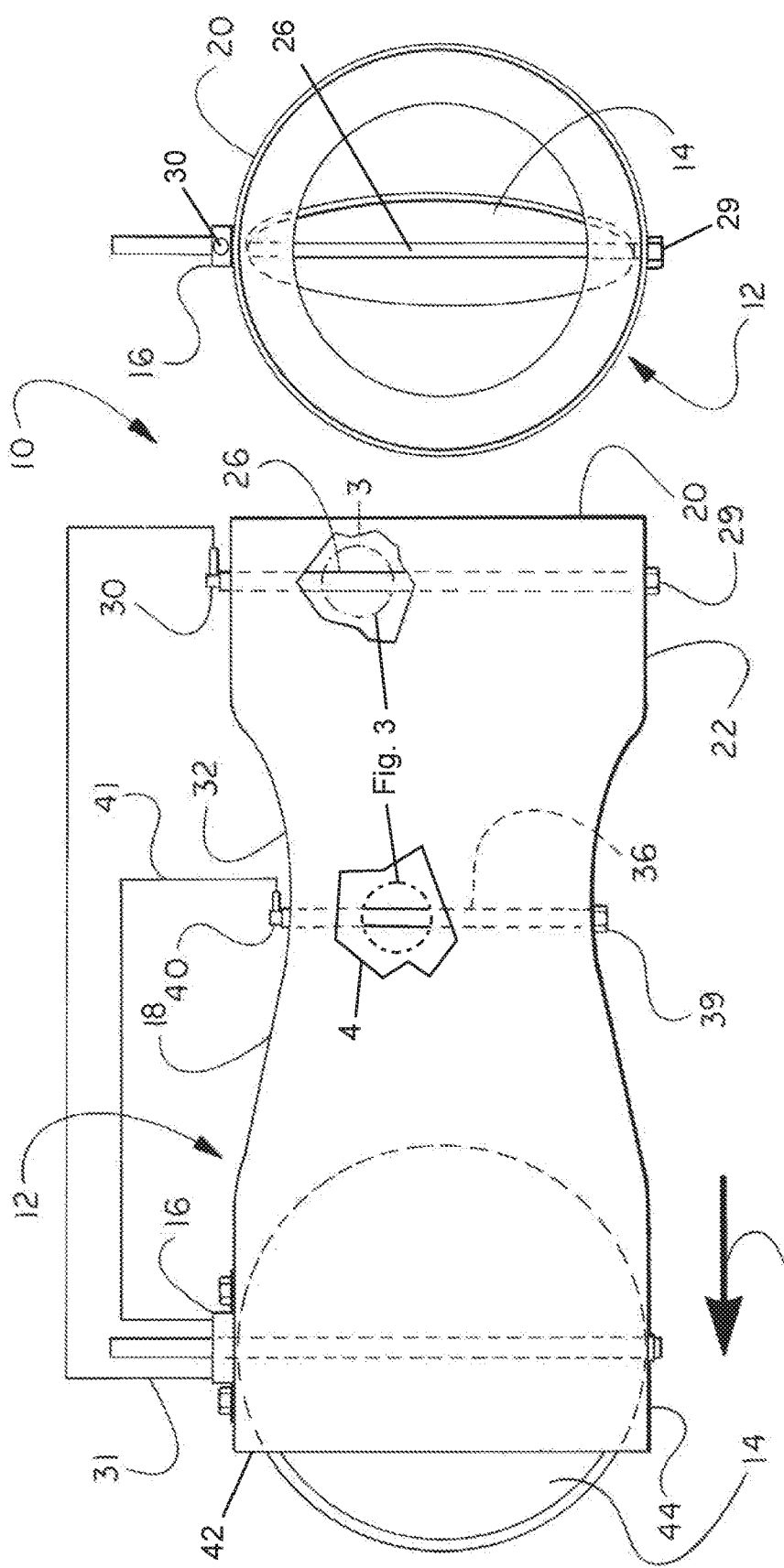

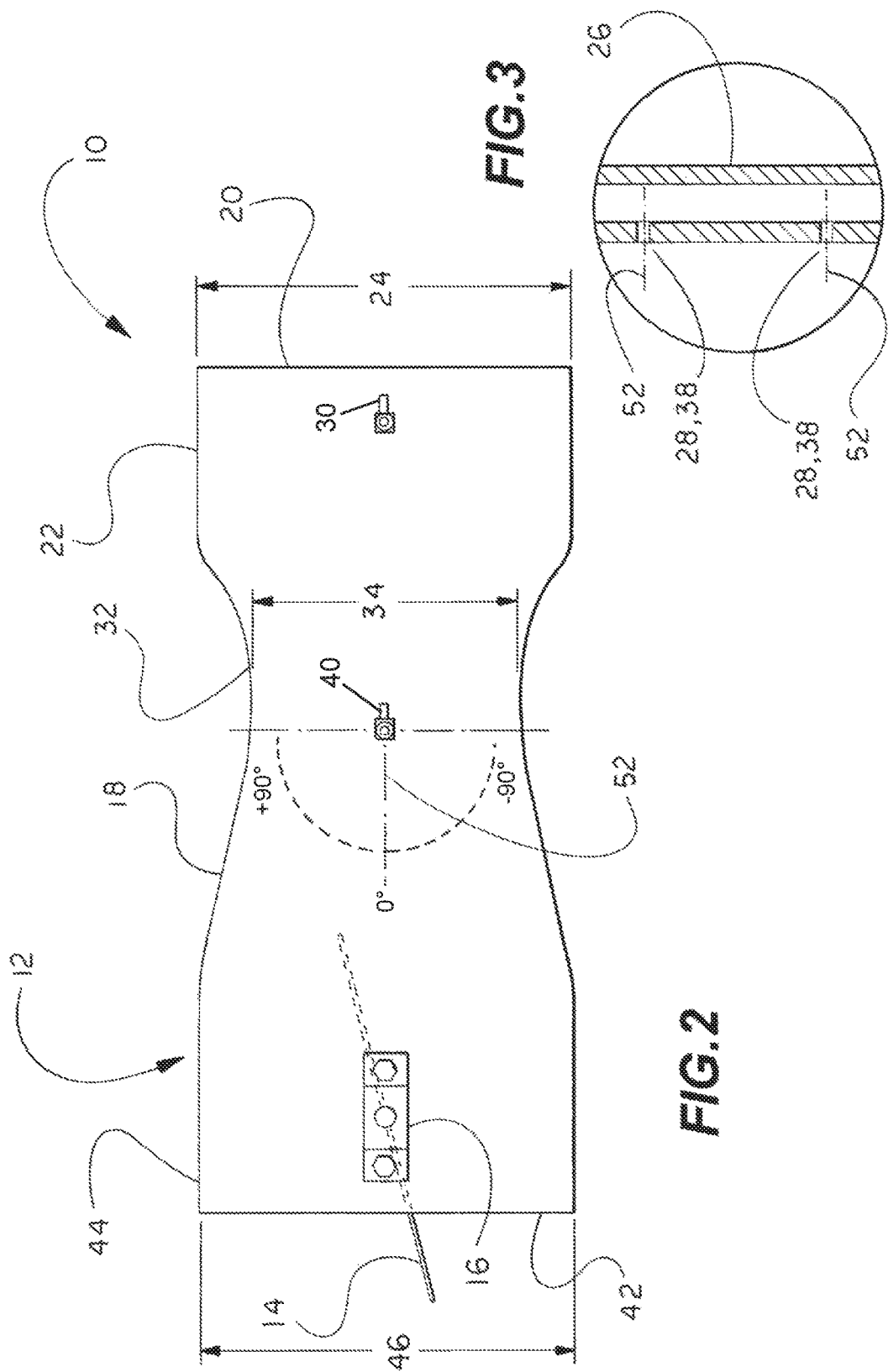

VENTURI AIR FLOW SENSOR AND CONTROL SYSTEM

CROSS REFERENCE TO RELATED PATENT APPLICATIONS

This patent application claims priority from U.S. Provisional Patent Application No. 62/616,670, filed Jan. 12, 2018, which is hereby incorporated by reference.

FIELD OF THE INVENTION

This invention relates to a Venturi air flow sensor and control system and more particularly to the configuration of a high pressure sensor and a low pressure sensor within a Venturi housing.

BACKGROUND OF THE INVENTION

In an air duct system, an air flow sensor and control system is used to control the flow of air into a room through supply ducts or out of the room through return or exhaust ducts. Prior air flow sensors include sensors used with a uniform diameter air duct section. When air flow is sensed in a uniform diameter air duct section, the air flow sensor typically has sensor tubes extending across the diameter of the air duct. One of the tubes measures high pressure using upstream openings, and the other sensor tube measures low pressure using downstream openings. The differential between the measured high pressure and the measured low pressure is used to calculate the air flow in the uniform diameter air duct section. See for example Engelke U.S. Pat. No. 4,453,419 and Woodbury U.S. Pat. No. 5,481,925. In commercial embodiments air flow sensors described above have accuracies that is typically no better than 5%. Further, the upstream openings for the high pressure sensor are subject to clogging from lint and other airborne particulate matter.

Another embodiment for measuring air flow employs a Venturi air flow sensor. The Venturi air flow sensor typically has a high pressure section with a diameter that is sized compatibly with the system air ducts and a low pressure center section resulting from a reduced diameter of the Venturi housing. A series of openings are spaced around the high pressure section and are connected to a high pressure tube. Another series of openings are spaced around the low pressure section and are connected to a low pressure tube. The differential pressure between the high pressure tube and the low pressure tube is then used to calculate the air flow through the Venturi. See for example Connet et al. U.S. Pat. No. 1,673,041, Berger U.S. Pat. No. 5,586,861, and Donahue U.S. Pat. No. 9,255,721. Where the pressure sensors are distributed around the perimeter of the Venturi housing, such sensors fail to account for variations in pressure across the diameter of the Venturi housing.

SUMMARY OF THE INVENTION

The present invention addresses the need for accurate air flow determination while avoiding problems associated with lint or other airborne particulate matter in the air stream. Particularly, the present invention includes a Venturi air flow sensor and control system. The Venturi air flow sensor and control system includes a Venturi housing with a high pressure inlet section and a low pressure reduced diameter center section. A high pressure sensor tube is located at the larger diameter high pressure section of the Venturi housing, and a low pressure sensor tube is located at the reduced diameter low pressure center section of the Venturi housing. Each pressure sensor comprises a tube extending across the diameter of the Venturi housing and includes a number of openings oriented in the downstream direction of the air flow through the Venturi housing. Each pressure sensor tube is closed at one end and is fitted with a connector at the opposite end. The connector for the high pressure sensor tube and the connector for the low pressure sensor tube are in turn connected to a controller that uses the differential pressure between the high pressure sensor tube and the low pressure sensor tube to calculate the air flow through the Venturi housing. Because each sensor tube has multiple downstream facing openings and extends across the diameter of the Venturi housing, the result is an average pressure thereby providing improved air flow determination through the Venturi housing.

Further objects, features and advantages will become apparent upon consideration of the following detailed description of the invention when taken in conjunction with the drawings and the appended claims.

BRIEF DESCRIPTION OF THE DRAWINGS

FIG. 1 is a side elevation view of a Venturi air flow sensor and control system in accordance with the present invention with a cutaway 3.

FIG. 2 is a top plan view of the Venturi air flow sensor and control system in accordance with the present invention.

FIG. 3 is detailed section view of a high pressure sensor tube of the Venturi air flow sensor and control system in accordance with the present invention as shown through the cutaway 3 in FIG. 1.

FIG. 4 is an inlet end elevation view of the Venturi air flow sensor and control system in accordance with the present invention.

DETAILED DESCRIPTION OF THE PREFERRED EMBODIMENTS

Turning to FIGS. 1-4, a Venturi air flow sensor and system 10 includes a Venturi housing 12 having an inlet 20 and an outlet 42 with air flowing from the inlet 20 through the Venturi housing 12 to the outlet 42 as indicated by the air flow direction arrow 50. The Venturi housing 12 has a generally circular cross-section as shown in FIG. 4, although other cross-section shapes can be employed. The inlet 20 is connected to ductwork (not shown) for receiving conditioned air from an air source, such as an air handler. The outlet 42 is connected to ductwork (not shown) for supplying air to a room or other space.

With reference to FIG. 2, the Venturi housing 12 has high pressure inlet section 22 with a diameter 24. The Venturi housing 12 has an outlet section 44 with an outlet section with a diameter 46. The high pressure inlet section 22 is connected to the outlet section 44 by a horn shaped center section 18. The horn shaped center section 18 constitutes a low pressure section 32 with a reduced diameter 34. A damper 14 is mounted for rotation in the outlet section 44. A damper controller 16 opens and closes the damper 14 in order to control the air flow through the Venturi housing 12 from connected upstream ductwork (not shown) into connected downstream ductwork (not shown).

In order to control the position of the damper 14 by means of the damper controller 16, the damper controller 16 requires the pressure at the high pressure inlet section 22 and the pressure at the low pressure section 32. In order to determine the pressure at the high pressure inlet section 22, the Venturi air flow sensor and control system 10 has a high pressure sensor tube 26. In order to determine the pressure at the low pressure section 32, the Venturi air flow sensor and control system 10 has a low pressure sensor tube 36. The high pressure sensor tube 26 is positioned in the high pressure inlet section 22 and extends across the high pressure section diameter 24. The low pressure sensor tube 36 is positioned in the low pressure section 32 and extends across the low pressure section diameter 34. The high pressure sensor tube 26 is closed at one end 29, and the other end has a high pressure connector 30. Similarly, the low pressure sensor tube 36 is closed at one end 39, and the other end has a low pressure connector 40.

FIG. 3 shows an enlarged section view of the high pressure sensor tube 26 and the low pressure sensor tube 36 as seen through cutaways 3 and 4 respectively. Except for length, low pressure sensor tube 36 and the high pressure sensor to 26 are the same. The high pressure sensor tube 26 has a series of downstream facing openings 28 along its length, and the low pressure sensor tube 36 has a similar series of downstream facing openings 38 along its length.

The downstream facing openings 28 and 38 are opened in the downstream direction as indicated by the air flow direction 50. In one embodiment, the center lines 52 of the downstream openings 28 and 38 are parallel (0°) to the direction of the air flow 50. The pressure sensor tubes 26 and 36, however, can be rotated from the 0° parallel position to any center line positioned between +90° and −90°. The downstream openings 28 and 38 are spaced along the length of the pressure sensor tubes 26 and 36 respectively.

The high pressure connector 30 and the low pressure connector 40 are connected by means of high pressure line 31 and low pressure line 41 to the damper controller 16. The damper controller 16 uses the differential pressure between the high pressure inlet section 22 and the low pressure section 32 to determine the air flow through the Venturi housing 12. The controller 16 then uses the determined air flow to control the position of the damper 14 and thereby adjust the air flow through the Venturi housing 12 and into or out of the room or other occupied space.

Because the openings 28 and 38 face downstream between +90° and −90°, the openings 28 and 38 cannot become clogged by lint or other airborne particulate matter. Further, because the pressure sensor tubes 26 and 36 extend along the majority of the diameter of the high pressure section 32 and the low pressure section 22 respectively, the pressure sensor tubes 26 and 36 produce a more accurate pressure reading than pressure openings around the periphery of the Venturi housing 12. As indicated above in connection with the prior art sensors for uniform diameter duct sections, the pressure sensors, and therefore the air flow determination, have an accuracy of no better than 5%. The Venturi air flow sensor and control system 10 of the present invention has substantially greater accuracy than 2.75%. The same improvement in accuracy is also achieved where the Venturi housing 12 has a square or rectangular cross-section and the high pressure sensor tube 26 and the low pressure sensor tube 36 extend across the full width, height, or diagonal of the square or rectangular cross section.

While the embodiment disclosed in the figures shows the high pressure sensor tube 26 located the high pressure inlet section 22, the high pressure sensor tube 26 could be located in the outlet section 44.

While this invention has been described with reference to preferred embodiments thereof, it is to be understood that variations and modifications can be affected within the spirit and scope of the invention as described herein and as described in the appended claims.

We claim:

1. A Venturi air flow sensor and control system comprising:
   a. a Venturi housing comprising:
      i. an inlet section;
      ii. an outlet section; and
      iii. a center section with a reduced cross-section connecting the inlet section to the outlet section, wherein air flows downstream from the inlet section to the outlet section through the center section with the reduced cross-section;
   b. a high pressure sensor tube closed at one end, having a high pressure connector at the opposite end, extending across the inlet section or the outlet section, and having high pressure openings facing downstream;
   c. a low pressure sensor tube closed at one end, having a low pressure connector at the opposite end, extending across the center section with the reduced cross-section, and having low pressure openings facing downstream;
   d. a damper positioned in the Venturi housing for controlling air flow through the Venturi housing; and
   e. a controller connected to the high pressure connector and the low pressure connector for determining air flow through the Venturi housing based on differential pressure between the high pressure connector and the low pressure connector, wherein the controller, based on the differential pressure, operates the damper.

2. The Venturi air flow sensor and system of claim 1, wherein the high pressure openings and the low pressure openings downstream within an angular orientation of between +90° and −90°.

3. A Venturi air flow sensor comprising:
   a. a Venturi housing comprising:
      i. an inlet section;
      ii. an outlet section; and
      iii. a center section with a reduced cross-section connecting the inlet section to the outlet section, wherein air flows downstream from the inlet section to the outlet section through the center section with the reduced cross-section;
   b. a high pressure sensor tube closed at one end, having a high pressure connector at the opposite end, extending across the inlet section or the outlet section, and having high pressure openings facing downstream; and
   c. a low pressure sensor tube closed at one end, having a low pressure connector at the opposite end, extending across the center section with the reduced cross-section, and having low pressure openings facing downstream,
   wherein air flow is determined from differential pressure between the high pressure connector and the low pressure connector.

4. The Venturi air flow sensor of claim 1, wherein the high pressure openings and the low pressure openings downstream within an angular orientation of between +90° and −90°.

* * * * *